Jan. 3, 1967            NAOTO HIDA            3,295,265
CIRCULAR MULTI-PURPOSE BUILDING AND ITS ASSEMBLING METHOD
Filed May 7, 1964                                                           4 Sheets-Sheet 1
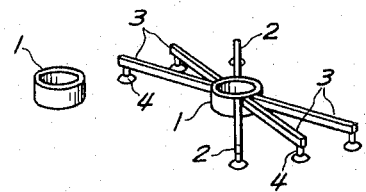
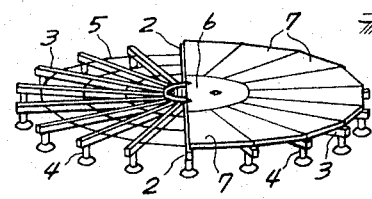
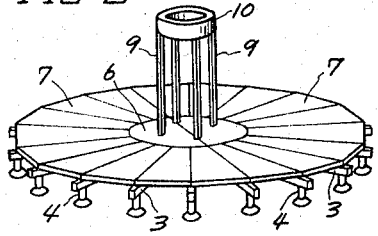
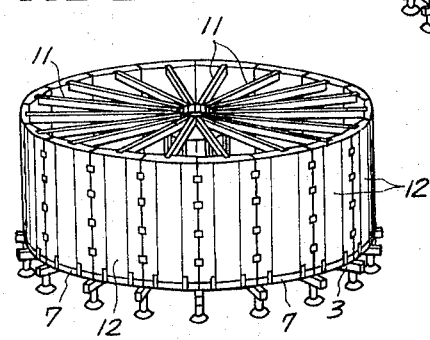
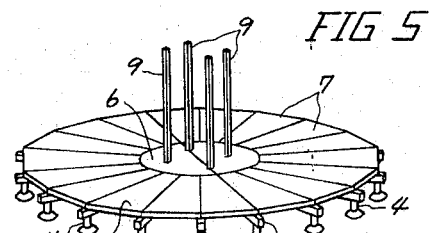
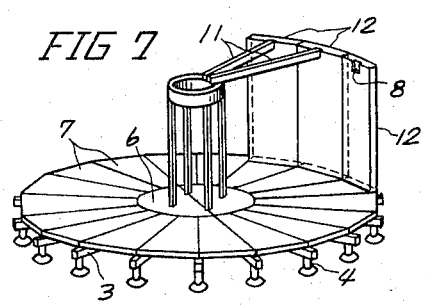
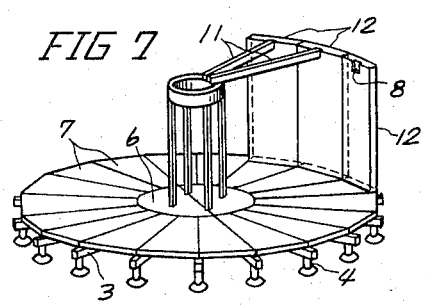
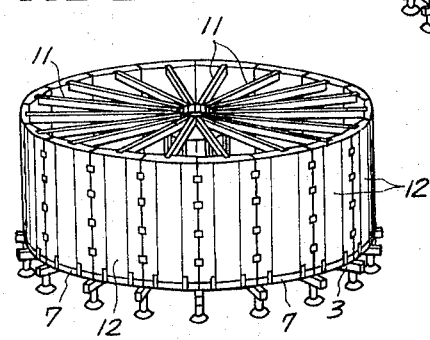

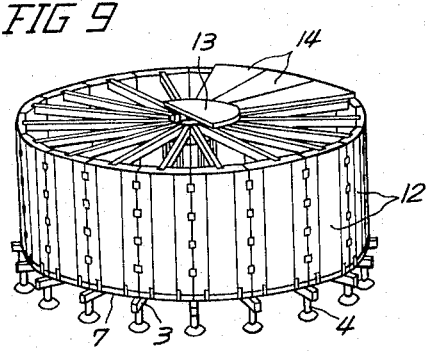
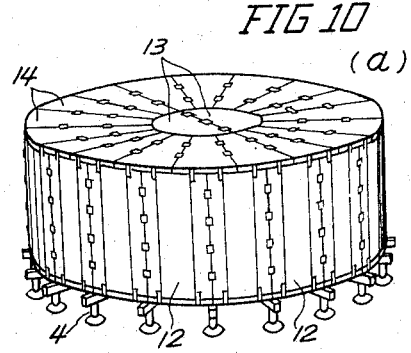
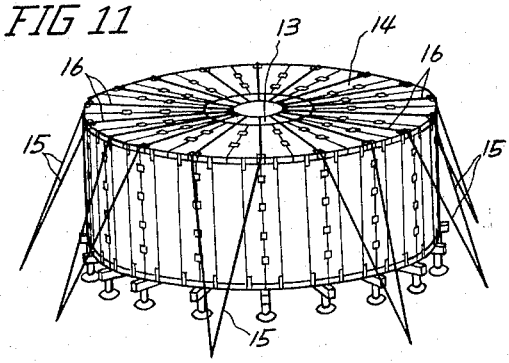
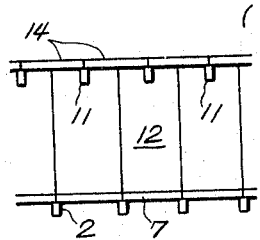
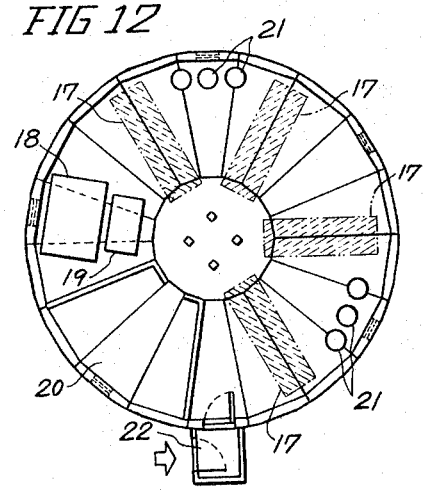
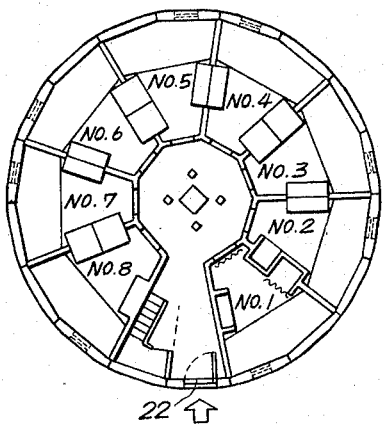

Jan. 3, 1967   NAOTO HIDA   3,295,265
CIRCULAR MULTI-PURPOSE BUILDING AND ITS ASSEMBLING METHOD
Filed May 7, 1964   4 Sheets-Sheet 3

Jan. 3, 1967 NAOTO HIDA 3,295,265
CIRCULAR MULTI-PURPOSE BUILDING AND ITS ASSEMBLING METHOD
Filed May 7, 1964 4 Sheets-Sheet 4
FIG 16
(a) (b) (c)
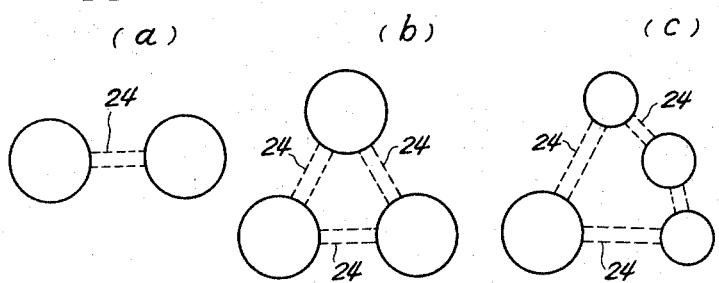
FIG 17
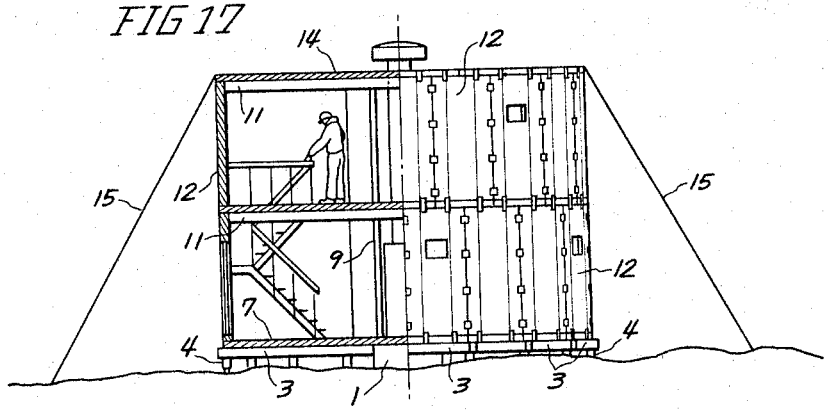
FIG 18 (a) (b)
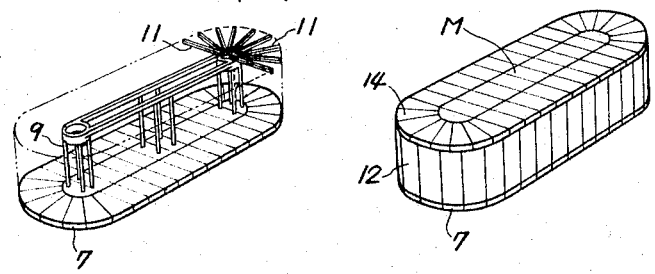

United States Patent Office
3,295,265
Patented Jan. 3, 1967

1

3,295,265
CIRCULAR MULTI-PURPOSE BUILDING AND ITS
ASSEMBLING METHOD
Naoto Hida, Tokyo, Japan, assignor to Takenaka Komuten Company, Ltd., Osaka-fu, Japan, a corporation of Japan
Filed May 7, 1964, Ser. No. 365,723
Claims priority, application Japan, Dec. 5, 1963, 38/65,460
8 Claims. (Cl. 52—82)

The present invention relates to a prefabricated building and its assembling method adapted for use in an untrodden desolate region, such as, arctic, antarctic or other unihabited land with a view to undertaking scientific observations or explorations in groups. More particularly, the invention contemplates the provision of a new and novel prefabricated building which should be assembled under the harsh circumstances, such as, encountered in the polar region, and also of a novel assembling method to carry out under such a condition as fighting through the deep freeze cold and blizzards.

As is known, the building to be erected in the polar region is fundamentally different from the ordinary house specified and designed by the Architectural Statute in the following respects:

(1) In general, a site or lot where a new building is to be erected is known beforehand, but it is always unknown in the polar region. Therefore the building will have to be erected at an unforeseen site.

(2) All the year round, it is deep freeze cold in the polar area, and further, a rigorous weather, such as, blizzard, is encountered so that a construction efficiency is considerably reduced compared with the normal one.

(3) A skilled construction crew including carpenters is not relied on among the polar expedition. Their camp building must be built by an unskilled construction crew.

(4) Construction work must be done by the men in heavy winter clothing with thick gloves.

(5) Since the construction materials are transported from the home country to the polar region, either by ship or airplane, it is preferred that the volume of packages therefor should be as small as possible and also of light weight, but sturdy.

(6) The description and number of building parts should be as small and interchangeable as possible.

(7) It is required that the building parts should be resistant to severe climatic conditions, and if one of them should be lost due to an unexpected accident, the damage thereof should not be wholesale, in other words, if one of them should be missing, the other would do for the purpose so that the assembly of parts could be accomplished.

(8) The building should be so arranged that the interior thereof is pleasant and comfortable to the human body and soul during an extended period of harsh pole life.

Since the limitations enumerated above are required of a polar region prefabricated building, an ordinary building or house on an ordinary flat tract of ground would be impossible to meet the requirements.

As described hereinbefore, this invention is directed to the prefabricated building having a reasonable function which meets the above requirements and also to a method for the assembly thereof. It is to be understood, however, that the prefabricated building and the method for assembling it will not be limited to the setting up of a base camp in the polar region, but will be applied to such a building as required to put up in the desolate region as well.

It is, therefore, an object of this invention to provide a novel prefabricated building adapted for the polar region easily assembled by an unskilled construction crew.

2

It is another object of the invention to provide a new and novel method for assembling a prefabricated building adapted for an expedition camp in a desolate or dessert region.

It is still another object of the invention to provide a novel prefabricated building suitable to be erected on an irregular tract of ground, yet of low cost and sturdy construction.

Numerous other objects and advantages of the invention will be apparent from the following description, which, taken in connection with the accompanying drawings, discloses preferred embodiments thereof.

Referring to the drawings, in which:

FIGURE 1 is an annular base on which the central core component is mounted.

FIG. 2 is a view showing the annular base provided with a plurality of floor joists or beams including standard and common ones, and a plurality of level jacks provided with the outer ends of the floor beams, respectively.

FIG. 3a shows a view in which the floor beams are interconnected with a plurality of connectors after the setting up of the whole floor beams in a circular form in accordance with the process of FIG. 2.

FIG. 3b is a view showing how to provide a level on the plane defined by the group of floor beams by means of a plurality of freely elevating jacks affixed to the outer ends of the beams, respectively.

FIG. 4 shows the laying up of half floor on the floor beams.

FIG. 5 shows a view in which an upright post member which serves as a center core is erected on the center of the whole floor laid up.

FIG. 6 is a view in which an annular top for receiving a plurality of roof beams is fixed on the top of the center core member.

FIG. 7 is a view in which a plurality of roof beams in the radial form are provided, the ends of which are inserted into the headers or recesses of the wall panel members.

FIG. 8 is a view showing the completed assembly of roof beams and wall panel members.

FIG. 9 is a view showing an initial stage of assembling the center roof panel and its surrounding roof panel members.

FIG. 10a is a view showing the completed assembly of the whole roof panel members.

FIG. 10b is a view showing the staggered relationship between the roof panel member and the bottom floor member.

FIG. 11 is a view showing the application of reinforced stays to this building.

FIG. 12 is a plan view of this building for use in work shop, observation work, or power generating plant.

FIG. 13 shows a plan view of this building adapted for living quarters, in which a stairway is provided if it is a two-storied building.

FIG. 16 is a schematic view showing a plurality of similar buildings of this invention connected with a plurality of communication aisles.

FIG. 17 is a side elevation of a two-storied building constructed in accordance with the principle of this invention.

FIGS. 18a and 18b are perspective views showing how to enlarge and develop a building of this invention into a larger and longer one.

Figure 14:
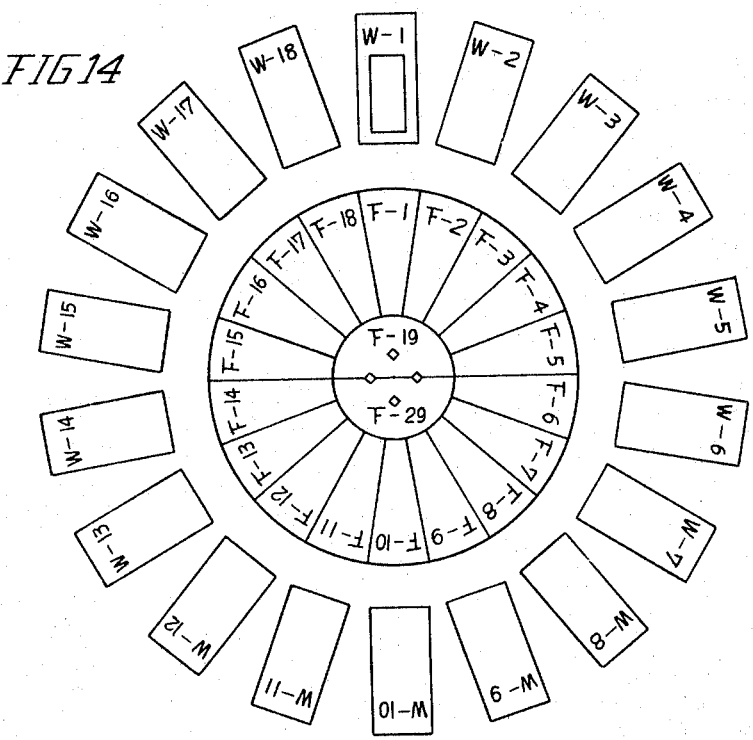
FIG. 14 is a schematic view showing an arrangement of the floor panel members and their corresponding wall panel members.

As clearly shown in the drawings, more particularly,

FIGS. 1–11 illustrate how to assemble the component parts of the prefabricated building of this invention in regular succession in the schematic perspective views.

FIG. 1 shows an annular metallic base 1 which serves as a central core foundation in the form of a circle or an even-numbered polygon, which may be collapsible for transportation. In the polar region, particularly in the Antarctic region, such as, at Ongul Island, Prince Harald Coast, in the Showa Base, it is very difficult to find a flat tract of site sufficient to set up a single house thereon. Therefore, it is desirable to have a building built on a considerably small flat site. This central core-type foundation base 1 provides a common foundation which supports one end of respective floor beams arranged in a radial form.

FIG. 2 shows how to arrange a plurality of radial floor beams by the principle of this invention. In this process, when it is required to erect a building with respect to the bearings or directions thereof, a pair of standard floor beams 2 in alignment is secured to the annular base 1. From this standard floor beam 2, another pair of beams 3 is fixed to the annular base spaced from the beam 2 at an equi-distance around the base in either a clockwise or anticlockwise manner. Further, an outer end of each floor beam 2 or 3 is supported by a freely elevating jack 4 fixed to the ground. In addition, an anti-freeze level (not shown) is provided on each floor beam so as to check the degree of levelling at any plane position.

Then, as seen in FIG. 3a, a plurality of metallic connectors 5 are secured to the side of respective floor beam 2 and 3 in order to maintain the plane position of individual floor beam and prevent rocking and rolling, whereby the floor panel members are secured to the beams as described hereinafter.

With the construction work described hereunto, it is possible to set up a horizontal floor plan necessary to lay up a plurality of floor panel members of identical shape and of equal size thereon.

As fully described hereinabove, an essential feature of the invention consists in a construction method in which, as clearly seen in FIG. 3b, an upper plane defined by the radial floor beams can be maintained even and flat even on an irregular tract of site, such as, $H_1$ and $H_2$, with the aid of a plurality of jacks 4 which are adjustable their height, even though a building is erected on a very narrow flat site S.

Furthermore, if the floor beam is hollow, it may be applied as a duct, e.g., for water supply, waste water drain, air-conditioning, and electric wiring network, etc., for the living or other quarters.

Then, as shown in FIG. 4, a central floor panel 6 is provided on the flat floor plan defined by the group of floor beams 2 and 3, and a plurality of surrounding floor panels 7 are laid up around the central floor panel 6 to form a complete floor thereon.

Next, as illustrated in FIG. 5, an upright post or an even number of posts 9 as a central core are affixed to the floor beam 3 through the central panel 6 or directly to the latter 6.

FIG. 6 shows an annular top 10 secured to the upper part of the central upright post core. This annular top 10 supports a plurality of roof beams, and besides, functions as an air chamber for air-conditioning service or as a source for water supply or electricity.

One end of each roof beam 11 is secured to the annular top 10 (see FIG. 7) while the other end thereof is inserted into a dovetail tenon provided at the upper part of the wall panel 12 erected around the outer periphery of the floor panels.

It is noted that a second feature of the invention lies in the arrangement of each roof beam 11 immediately upon neither a floor beam 3 nor a joint between two adjacent wall panels 12. In general, the connection or header of the wall panel 12 increaess its rigidity due to a reinforcement member, such as, frame, therefore the heat insulation of the wall panel usually tends to be deteriorated thereby, which will bring about the so-called, "cold bridge phenomenon (Kältebrücke)." Moreover, if a roof beam member is set up on the thermal inferior part, the heat insulation caused by cold bridge will be lowered due to the reinforcement given to the portion in question.

However, the above disadvantage will be obviated by providing each beam member at another position than the joint between two adjacent wall panel members as described hereinbefore. It is understood in this case that a framework (not shown) for supporting a load given by an individual beam should be embedded within the wall panel member.

A perspective view of a complete erection of building components including beams 11 and wall panels 12 except the roof panels is shown in FIG. 8.

FIG. 9 shows how to arrange a circumferential roof panel 14 around the central roof panel 13 in succession, which is finished all over the roof as shown in FIG. 10a. In this assembly process as shown in a schematic diagram of FIG. 10b, the relative positions of the bottom floor beam 2, the floor panel 7, the top roof beam 11, and the peripheral roof panel members 14 arranged in a predetermined form are displaced each other, in other words, these components are all in staggered relation, which is one of the important characteristics of this invention. This staggered arrangement of components is effective for the reduction of "cold bridge" on the joint portion of the wall panel 12.

The finished shelter building of FIG. 11 is reinforced by a net of wire rope 16 and a plurality of anchor means of stay-wire 15 in order to make the building firmer and stronger so as to provide a complete protection against gales and blizzards.

In the assembly method of building components in accordance with this invention, the connection between two or more floor panels, floor panel and floor beam, floor panel and wall panel, wall panel and roof panel, two or more roof panels, roof panel and roof beam, respectively, is effected by a wedge to transport the structural stress of building construction.

FIG. 12 shows a plan of this polar building, for example, for use in electric power generation, work shop, and observation etc., showing generator 17, ice melting chamber 18, hot water chamber 19, work shop 20, oil tank 21 and door 22, etc.

FIG. 13 shows a plan of the building of this invention for living quarters, in which a spacious hall without partitions can be provided, for example, for use in a dining or meeting hall. A hot air stove 23 may be placed within the central core to supply hot air from the air chamber provided in the annular top to an individual room, Nos. 1–8 through a hollow roof beam.

FIG. 14 is a plan showing an arrangement of floor panels, F–1 to F–18, of a number equal to the number of wall panels, W–1 to W–18, which clearly explains how to erect respective components even by an unskilled construction crew.

Figure 15:
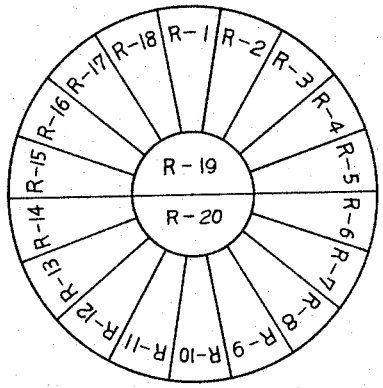
FIG. 15 is a schematic view showing an arrangement of roof panel members.

Similarly, FIG. 15 is a schematic diagram of a group of roof panels showing the central roof panels, R–19 and R–20, and peripheral roof panels, R–1 to R–18.

FIG. 16 is also a schematic diagram of two or more buildings of this invention connected with one another by one or more aisles 24. FIGS. 16a, 16b and 16c show various arrangements. A feature of this arrangement lies in an organic connection of several houses. In a house of rectangular section, a communication aisle, is often made in a horizontal or vertical direction to the wall surface of the square building. However, a communication path of any direction, if desired, may be made in this circular house of this invention.

By the principle of this invention, a two-storied building may be erected by stacking one upon another as seen in FIG. 17, which is a side elevation, partly in section, of the two-storied building made by this invention. In this case, a stairway can be made within one unit of panel. In such a building as the one for observing a rocket, it is necessary to provide an extended large space sufficient to accommodate a long article. In this event where a long space is required, it is proposed that a building is divided into two parts at the position where the standard floor beam (see FIG. 2) so as to insert an intermediate building M of rectangular shape and provide an enlarged one as illustrated in FIGS. 18a and 18b.

The essential features of the invention have been described in the foregoing in connection with various schematic diagrams, and thus the polar building and its assembling method are able not only to meet miscellaneous requirements in the polar region, but also carry out to build it at any desolate land other than the pole. In addition, it may be applied in the torrid zones, jungles, and deserts entirely opposite to the deep frigid zones. It is seen that prefabricated houses and buildings erected in accordance with the invention include observation post, guard box, control quarters, central control room, waiting room, sound-proof room in a factory, measurement room, accommodation room, information office, field office, medical first-aid station, shower room, public lavatory, mountain hut, and dormitory etc.

Various modifications, equivalents, and alternative constructions may be employed without departing from the spirit and scope of the invention as set forth in the accompanying drawings and foregoing specification, and as defined in the following claims.

I claim:

1. A multi-purpose building comprising, in combination, an annular foundation base, an even number of floor beams secured to said annular base in a radial form, one end of said floor beam being secured to said annular base while the other end of said floor beam being supported by a freely elevating jack, a central circular floor panel, a plurality of floor panels surrounding said central circular floor panel, a plurality of wall panels of a number equal to the number of said floor panels, said wall panels being erected along the periphery of said floor panels, a plurality of upright posts as a central core, an annular top provided at the top of said upright posts, an even number of roof beams in a radial form being secured around said annular top, one end of said roof beam being secured to said annular top while the other end of said roof beam being inserted into a recess provided at a different position from the joint of said two adjacent wall panels, a plurality of roof panels provided on said roof beams, all the joints of said building parts being secured together by means of a clamp.

2. An assembling method for a multi-purpose building which comprises the steps of providing an annular foundation base, securing an even number of floor beams to said annular foundation base, one end of said floor beam being secured to said annular base while the other end of said floor beam being supported by a freely elevating jack, providing a central circular floor panel on a floor plan defined by said annular base and said floor beams, providing a plurality of floor panels surrounding said central circular floor panel on said floor plan, erecting a plurality of wall panels of a number equal to the number of said floor panels along the periphery of said floor panels, erecting a plurality of upright posts as a central core, providing an annular top at the top of said upright posts, securing an even number of roof beams in a radial form to said annular top, one end of said roof beam being secured to said annular top while the other end of said roof beam being inserted into a recess provided at a different position from the joint of said two adjacent wall panels, providing a plurality of roof panels on said roof beams, and securing all the joints of said building parts together by means of a clamp.

3. A multi-purpose building as set forth in claim 1 characterized in that said floor beam and said roof beam are made of a hollow member adapted for a duct or a channel carrying utility lines.

4. An assembling method for a multi-purpose building as set forth in claim 2 which comprises providing said floor beam and said roof beam as a hollow member so as to adapt them for a duct or a channel carrying utility lines.

5. A multi-purpose building as set forth in claim 1 characterized in that said floor panel or said roof panel consists of a central panel in the form of one or more similar sheet and a plurality of peripheral panels arranged in as the form of a sunflower.

6. A multi-purpose building as set forth in claim 1 characterized in that a plurality of interchangeable wall panel members of the same form are provided, one or more of said wall panel member being provided with a portal or portals, said wall panel provided with said portal or portals being erected at a desired position, the number of said portal or portals being selected as many as desired.

7. A multi-purpose building as set forth in claim 1 characterized in that a two-storied building is built by substituting said floor panel for said roof panel and extending or stacking the height of the components in the vertical direction.

8. A multi-purpose building as set forth in claim 1 characterized in that said central floor panel is divided into two parts and an intermediate floor panel of a rectangular form is inserted into a space created by the division of said two parts so as to provide a larger building.

No references cited.

FRANK L. ABBOTT, *Primary Examiner.*

R. A. STENZEL, *Assistant Examiner.*